Figure 1:
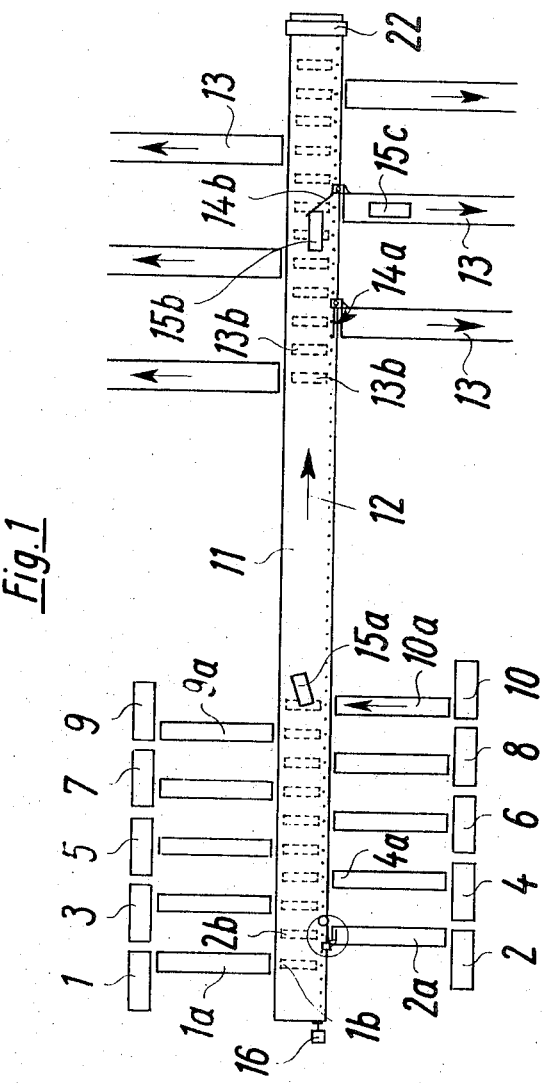

United States Patent [19]
Sluysmans

[11] 3,858,712
[45] Jan. 7, 1975

[54] METHOD AND APPARATUS FOR ALLOCATING INDIVIDUAL ITEMS ON CONVEYOR BELTS

[75] Inventor: Tony Sluysmans, Scerrebeck, Belgium

[73] Assignee: Sandco Ltd., Ottawa, Ontario, Canada

[22] Filed: Mar. 19, 1973

[21] Appl. No.: 342,445

[30] Foreign Application Priority Data
Apr. 22, 1972 Germany.......................... 2219844

[52] U.S. Cl.................... 198/78, 198/38, 198/40
[51] Int. Cl............................................. B65g 37/00
[58] Field of Search......... 198/40, 38, 78; 214/11 C

[56] References Cited
UNITED STATES PATENTS
3,055,481  9/1962  Austin................................. 198/40
3,666,080  5/1972  Alfredsson........................... 198/38

Primary Examiner—Evon C. Blunk
Assistant Examiner—Douglas D. Watts
Attorney, Agent, or Firm—Craig & Antonelli

[57] ABSTRACT

Method and apparatus for allocating individual items, e.g., pieces of luggage, on a steel conveyor belt supplied by a number of feeder belts, as is the case for example at airports, railroad stations or post offices, whereby magnetic spots are placed on the steel conveyor belt as markings, which are then registered at every feeder belt and whereby feed gates associated to every feeder belt are equipped in such a manner that at least one space is always kept free on the steel conveyor belt for a piece of luggage from every feeder belt.

9 Claims, 7 Drawing Figures

METHOD AND APPARATUS FOR ALLOCATING INDIVIDUAL ITEMS ON CONVEYOR BELTS

The present invention relates to a method and apparatus for allocating individual items on conveyor belts which are supplied by additional feeder belts, arranged at a distance from one another, and on which a minimum distance should be maintained between the individual items supplied in order to permit said items to be automatically removed from said conveyor belt again.

Allocating facilities of this type are known in airports, for example, where the passengers' luggage is transported from various check-in points on the conveyor belt and distributed therefrom to various receiving points, which depend on the destination of the passenger. To provide increased automation in this field, a method is also known where conveyor belts are employed which have control tracks on which the destination which is associated to the respective piece of luggage is placed, i.e., in the form of magnetic spots, so that automatic removal of the piece of luggage is possible at the corresponding removal point by means of a scanning head responding to the stored information. It has been shown that facilities of this type have the significant disadvantage of being susceptible to undesirable back-ups if a number of feeder belts are provided for placing the pieces of luggage onto the central conveyor belt one after the other. The reason for this is, for example, that so many pieces of luggage are placed onto the conveyor belt by a check-in desk which is connected with the conveyor belt by means of a feeder belt, that, at least temporarily, no pieces of luggage can be placed onto the conveyor belt from subsequent check-in desks. This disadvantageous circumstance can necessitate significant delays in air traffic, and above all uncomfortable waiting periods for the passengers.

It is therefore the object of the invention to provide a method and apparatus which ensure that, even with many feeder belts and many check-in points, as is the case at large airports, for example, pieces of luggage can be placed onto the central conveyor belt continuously from each individual check-in point, such that no backups is expected at any point.

In order to ensure that at least space for one piece of luggage is always reserved on the conveyor belt for every check-in desk and for every feeder belt, according to the invention said conveyor belt has equidistant markings associated in a track which are sensed and counted by individual control means associated with each feeder belt, and each control means has a gate blocking said feeder belt, said gate acting until said control means has counted a number of markings which is proportional to the number of feeder belts arranged behind said control means, in the direction of travel of said conveyor belt, whereby when said gate is released the number of markings representing a counting unit is erased at the location of said control means.

This method provides that each feeder belt can only place a piece of luggage on the conveyor belt after a given waiting period has expired, whereby the waiting period increases if pieces of luggage are already on the conveyor belt, since the corresponding marking points are erased and no longer counted by the control means. The invention also ensures that the distance between the individual pieces of luggage cannot be below a given dimension, so as not to make the subsequent automatic removal more difficult for the scanning heads mentioned at the outset.

In order to perform the method according to the invention said conveyor belt is a magnetizable steel belt having a plurality of control tracks which can be contactlessly sensed, of which one is designed as a marking track to be provided with magnetic spots. To produce the magnetic spots, it is possible to employ magnetizing means responding at given intervals, which can be a magnetic coil excited briefly by direct current, for example. The marking track can preferably be located at the edge of the steel belt, so that it does not affect the other control tracks required for indicating the destination. For scanning the marking track, the control means can have scanning heads responding to magnetic forces, which can be designed in the form of magnet diodes or similar items, for example, as described in German Pat. application No. 21,37,700.

Figure 2:
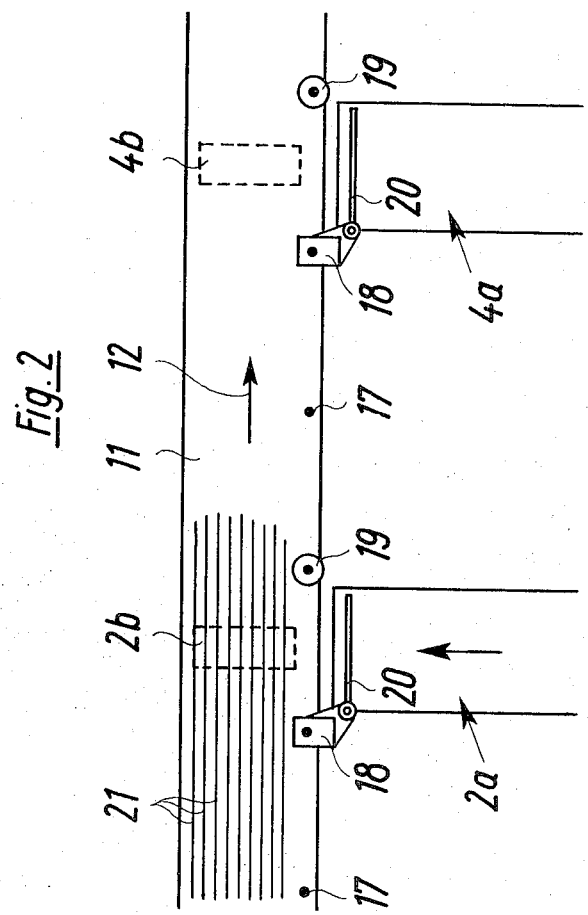

The above discussed and other objects, features and advantages of the present invention will become more apparent from the following description thereof, when taken in connection with the accompanying drawings, in which FIG. 1 shows a schematic total view of a baggage check-in and distribution system of an airport with a central conveyor belt employed according to the invention, and FIG. 2 shows an enlarged detail view of a portion of the conveyor belt and a feeder belt according to FIG. 1.

FIGS. 3–7 show various modifications of the conveyor belt according to the invention.

Referring now to the drawings FIG. 1 shows a plurality of check-in desks 1 to 10, each of which is combined with a feeder belt 1a to 10a, which brings pieces of luggage from passengers who are checked in at the individual check-in desks of various airlines, for example, to a central conveyor belt 11, from which they are then conveyed in the direction of the arrow 12 to a plurality of discharge belts 13. These discharge belts 13 bring the pieces of baggage to the respective loading points for various destinations. For this purpose, in the indicated practical example the conveyor belt 11 is designed as a magnetizable steel belt having various control tracks in which the information is placed which accompanies each piece of baggage put onto the conveyor belt 11 by the feeder 1a to 10a and which effects the automatic discharge of the pieces of luggage onto the respective discharge belts 13.

This occurs in that at the check-in desks 1 to 10 the check-in personnel feeds the respective flight destination data into the central control computer which, in addition to the necessary registration of the luggage, places a magnetic spot in each of the respective control tracks by means of the magnetizing means 1b, 2b arranged beneath the conveyor belt 11 and illustrated by dotted lines. At corresponding scanning heads the magnetic spot actuates deflection means 14a, 14b at the discharge belts, the deflection means 14a, 14b ensuring, by means of an electric or pneumatic drive, that the piece of baggage coming from the feeder belts 1a to 10a assumes the positions 15a, 15b and 15c illustrated in FIG. 1. The magnetizing means 1b, 2b can also comprise coils supplied with direct current which produce magnetic spots briefly on a certain control track, of which the conveyor belt 11 can have ten for example. If a magnet diode at the scanning head 13b is triggered, for example, the deflection means 14a or 14b will respond and convey the piece of luggage located on the conveyor belt 11 to the associated discharge belt 13.

Since the above described method does not yet ensure that, for example, pieces of luggage can be placed on the conveyor belt 11 from the check-in desk 10 at any time, even if pieces of luggage are placed on from the previous check-in desks 1 to 9, the following solution has been selected:

The conveyor belt 11 has in the area of one of its edges a further magnetic control track which is produced in that equidistant magnetic spots are placed on the conveyor belt 11 by a magnetizing means 16 which, as viewed in the direction of travel of the conveyor belt, is arranged in front of the first feeder belt 1a and which can also comprise a magnetizing coil which is supplied briefly with a direct current. The distance between the magnetic spots can be selected in such a manner that it corresponds to the distance required for placing a piece of luggage onto the conveyor belt and which can be 3 to 4 ½ feet for example; however it can also be a fraction of this distance.

As can be seen in detail from FIG. 2, each feeder belt 1a to 10a now has associated to it a control point having counting means 18 registering the magnetic spots 17 given by the magnetizing means 16 and erasing means 19 which is capable of erasing the magnetic spots. Each counting means 18 operates conjointly with a gate 20 which prevents the pieces of luggage from being placed onto the conveyor belt 11 from the feeder belts 1a to 10a until a corresponding release pulse is given by the counting means 18. This release pulse depends on the number of magnetic spots 17 registered by the counting means 18 and on the location, viewed in the direction of travel 12 of the conveyor belt 11, of the corresponding feeder belt.

If, for example, as indicated above the distance between the individual magnetic spots 17 already corresponds to the clearance of approximately three to 4 ½ feet required for placing a piece of luggage onto the conveyor belt and removing it again without difficulty, one magnetic spot would be viewed as the counting unit. In this case, the counting means 18 of feeder belt 1a, i.e., the first feeder belt, which in the illustrated practicle example would have to be arranged on the side of the feeder belts 2a to 10a for scanning the control track of the magnetic spots 17, would have to be designed in such a manner that it releases the associated gate after every ninth magnetic spot, i.e., when every tenth magnetic spot is reached, and places the piece of luggage onto the conveyor belt. The feeder belt 2a illustrated in FIG. 2 would release the gate 20 when every ninth magnetic spot is reached, so that a piece of luggage located on the feeder belt 2a could be pushed onto the conveyor belt 11. At the same time a piece of luggage is pushed onto the conveyor belt 11, the same ninth magnetic spot which released the gate would be erased by the erasing means 19 so that this magnetic spot would no longer be registered on reaching the counting means of feeder belt 4a and can be considered an indication that the conveyor belt is occupied. Feeder belt 4a, whose counting means 18 is designed in such a manner that it can release the gate every time the seventh magnetic spot is scanned, would therefore permit the conveyor belt which is already occupied with the piece of luggage from feeder belt 2a to advance the distance between two magnetic spots before the seventh magnetic spot can be counted and the gate released. Thus, the system on which the counting means 18 is based is designed in such a manner that the gate 20 associated to every feeder belt 1a to 10a remains in effect until the counting means 18 has counted the number of magnetic spots which corresponds to the number of additional feeder belts located behind the feeder belt in question, as viewed in the direction of travel 12 of the conveyor belt 11. The feeder belt 6a would therefore be able to release the gate every time it has counted four magnetic spots, i.e., every time the fifth magnetic spot is reached; the counting means of feeder belt 9a would release every time after two magnetic spots are counted so as to ensure at all times that one magnetic spot is also still free for feeder belt 10a, i.e., that a space is free on the conveyor belt 11 for a piece of luggage.

Of course, it is not necessary to select the distance between magnetic spots 17 so as to correspond with the clearance required for a piece of luggage. It would also be possible for the necessary clearance for a piece of luggage to correspond to every magnetic spots; it must then only be ensured that the number of magnetic spots scanned by the counting means is proportionally increased prior to release, so that instead of eight magnetic spots to be counted for the counting means 18 of feeder belt 2a, there would have to be 32 magnetic spots to be counted each time. The counting unit would then be four magnetic spots and the control pulse for releasing the gate 20 would have to be triggered each time by the first magnetic spot of the counting unit following the number of counting units to be counted. Of course, it would then also be necessary for the entire counting unit of magnetic spots to be erased in the erasing means 19 when a piece of luggage is placed onto the conveyor belt 11. Only then can it be ensured that the clearance corresponding to one counting unit of magnetic spots remains free for the piece of luggage on the conveyor belt 11.

Also indicated on the conveyor belt 11 in FIG. 2 are the control tracks 21 for nine different discharge means, in which the corresponding magnetic spots are placed by the magnetizing means 2b, 4b, which then cause the deflection means 14a, 14b of the discharge belts 13 to be triggered. As can be seen from FIG. 1, demagnetizing means 22 must be provided at the end of the conveyor belt 11 to ensure that all magnetic spots are erased again to permit control pulses to be fed in again after the lower section of the belt has returned.

Figure 3:
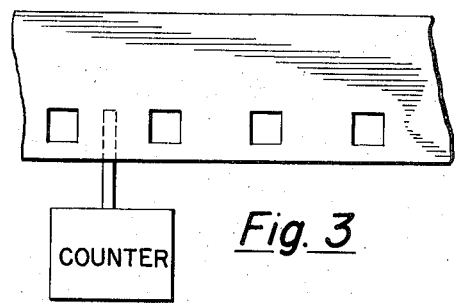
Figure 4:
Figure 5:
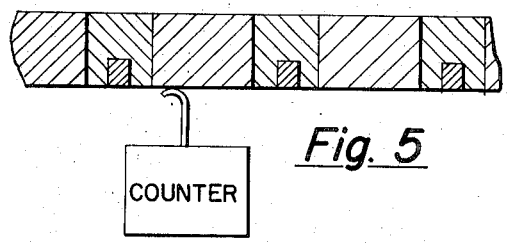
Figure 6:
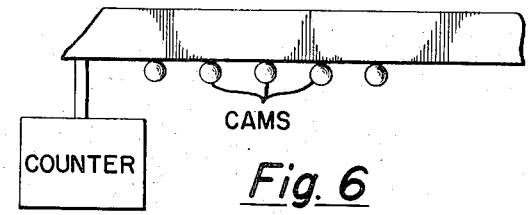
Figure 7:
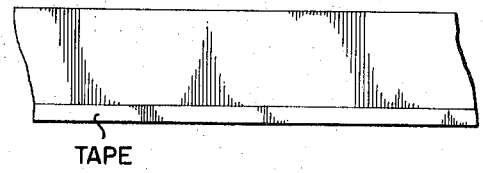

The invention is not limited to the practical example with a magnetizable steel belt illustrated in the drawings. It would also be conceivable to put the new allocating method into practise with an apparatus in which a perforated conveyor belt is provided (as shown in FIG. 3), whose perforations can be employed again each time as counting units for reserving free spaces for luggage to be placed thereon, whereby these perforations could be penetrated by jets of air (as shown in FIG. 4), in a manner similar to that in other fields of technology, which could trigger the corresponding control pulse. It would also be conceivable to permit electrical contact brushes to extend through these perforations (as shown in FIG. 5) permitting, in a similar manner, trouble-free allocation of pieces of luggage or similar items on the conveyor belt if it is ensured that the perforations can be closed by folding over folded tongues or similar items, for example, for the purpose of erasing them. It would also be conceivable to provide conveyor belts with cams (as shown in FIG. 6) which can be sensed mechanically and folded over to erase them. An embodiment is also possible in which the travel of the conveyor belt is simulated in synchronism with a separately travelling magnetic tape (as shown in FIG. 7), which is then employed as the control tape for the occupancy of the conveyor belt.

It should also be noted in all cases that it is not, as illustrated in the drawings, absolutely necessary for the individual feeder belts 1a to 10a to also be located at the same distance from one another. However it must be ensured that the feeder belts are arranged with such a distance between them that this distance can be sensed and expressed by at least one counting unit of magnetic spots. In other words, it is quite possible to eliminate feeder belt 6a with check-in desk 6 with an apparatus according to FIG. 1. The number of magnetic spots to be scanned by the feeder belts 5a to 1a located in front of it would therefore be one counting unit less.

Obviously, many modifications and variations of the present invention are possible in the light of the above teachings. It should therefore be understood that within the scope of the appended claims, the invention may be practiced otherwise than as specifically described.

Having thus fully disclosed my invention, what I claim is:

1. Apparatus for allocating individual items spaced from one another on a conveyor means of the type which includes countable markings therealong and which is supplied by feeder means arranged along said conveyor means, each of said feeder means having an associated gate means for blocking each of said feeder means, comprising:
   control means associated with each of said gate means for counting said markings,
   release means associated with each of said gate means for releasing said gate means so as to permit the feeding of an item from said feeder means onto said conveyor means in response to said control means counting a predetermined number of markings, and
   erasing means associated with each of said release means for erasing markings representing a predetermined counting unit along said conveyor means at the location of said gate means at which the item is released onto said conveyor means in response to said release means releasing said gate means.

2. Apparatus according to claim 1, wherein said conveyor means comprises a magnetizable steel conveyor belt provided with marking track means for receiving markings in the form of magnetic spots, such that when each of said control means has counted a number of magnetic spots which is proportional to the number of feeder means located downstream of each of said feeder means, said gate means releases an item onto said conveyor means and said erasing means erases a number of magnetic spots representing a counting unit.

3. The apparatus set forth in claim 2, wherein magnetizing means responding at given intervals are employed for producing said magnetic spots.

4. The apparatus set forth in claim 2, wherein said magnetic spots are arranged in the area of side edges of said conveyor belt.

5. Apparatus for allocating individual items on conveyor belts which are supplied by additional feeder belts, arranged at a distance from one another, and on which a minimum distance should be maintained between the individual items supplied in order to permit said items to be automatically removed from said conveyor belt again, comprising a magnetizable steel conveyor belt, said steel conveyor belt being equipped with a plurality of control tracks which can be contactlessly sensed, of which one is designed as a marking track for being provided with equidistant magnetic spots which are sensed and counted by individual control means associated with each of said feeder belts, and in which the individual control means has a gate which blocks said feeder belt until a number of markings has been counted at the control means which is proportional to the number of feeder belts located behind said control means, in the direction of travel of said conveyor belt, so that when said gate is released the number of markings representing a counting unit is erased at said control means, said control means being provided with scanning heads responding to magnetic forces for scanning said magnetic spots.

6. The apparatus set forth in claim 5, in which said scanning heads are connected with a gate, which stops the associated feeder belt or retains said individual items until a release pulse is given by said scanning head.

7. The apparatus set forth in claim 5, in which individual erasing means for said magnetic spots are associated with each feeder belt, said erasing means erasing the number of magnetic spots on said conveyor belt corresponding to a counting unit after release of said gate and after an item has been pushed onto said conveyor belt.

8. A method for allocating individual items spaced from one another on a conveyor means which is supplied by feeder means arranged along the conveyor means, each of the feeder means having an associated gate means for blocking each of the feeder means, comprising:
   providing at least one marking representative of each of a plurality of counting units along the conveyor means,
   sensing and counting the markings at each of the feeder means,
   releasing an item from said feeder means onto said conveyor means when a predetermined number of markings have been counted,
   and
   erasing upon release of the item the markings representing a counting unit along the conveyor means at the location of the gate means at which the item is released onto the conveyor means.

9. A method according to claim 8, wherein the step of providing at least one marking includes providing a predetermined number of markings proportional to the number of feeder means arranged downsteam of each of said feeder means in the direction of movement of said conveyor means.

* * * * *